United States Patent

[11] 3,588,037

| [72] | Inventor | Henry B. Ritchie<br>Mason, Ohio |
|---|---|---|
| [21] | Appl. No. | 869,729 |
| [22] | Filed | Oct. 27, 1969 |
| [45] | Patented | June 28, 1971 |
| [73] | Assignee | General Electric Company |

[54] EROSION SHIELD FOR A THROTTLING VALVE
5 Claims, 4 Drawing Figs.

[52] U.S. Cl. ..................................................... 251/127,
137/625.69
[51] Int. Cl. ........................................................ F16k 47/00
[50] Field of Search .......................................... 251/118,
127, 282, 324; 137/625.25, 625.28—38, 625.64,
625.68, 625.69, 625.48

[56] References Cited
UNITED STATES PATENTS

| 2,517,061 | 8/1950 | Von Stackelberg | 137/625.25X |
| 2,997,065 | 8/1961 | Johnson | 137/625.69 |
| 3,112,764 | 12/1963 | Anderson et al. | 251/282X |
| 3,347,217 | 10/1967 | Di Giorgio | 55/510X |

Primary Examiner—Henry T. Klinksiek
Attorneys—Derek P. Lawrence, Thomas J. Bird, Jr., Lee H. Sachs, Frank L. Neuhauser, Oscar B. Waddell and Joseph B. Forman ABSTRACT: A shield is provided for preventing erosion of a lightweight housing surrounding a spool-type throttling valve. Movement of the conventional spool permitted high-pressure fuel to flow therepast and to impinge directly upon the wall of the housing, causing erosion thereof. A perforated cylindrical shield is placed within the housing with a solid-wall portion located directly opposite the fuel outlets, thus preventing direct impingement of fuel on the housing.

PATENTED JUN28 1971  3,588,037

INVENTOR.
HENRY B. RITCHIE
BY
Thomas J. Bird, Jr.
AGENT

EROSION SHIELD FOR A THROTTLING VALVE

BACKGROUND OF THE INVENTION

The present invention relates generally to throttling valves, and more particularly, to a shield for preventing erosion of a housing associated with the throttling valve. The invention herein described was made in the course of or under a contract, or a subcontract thereunder, with the United States Department of the Air Force.

In the design of gas turbine engines, throttling valves are utilized to control the amount of fuel delivered to both the primary combustors and to the augmenter combustors. Because of the high pressures associated with both the primary and augmenter combustion zones in a gas turbine engine, it is desirable to provide fuel to these combustion zones at a very high pressure to eliminate the possibility of flashback within the fuel-carrying system. Throttling valves utilized in such a system, therefore, must be capable of carrying fuel at extremely high pressures.

In the design of fuel-throttling valves for use with gas turbine engines, the overall weight of the valve is critical. Every pound of excess weight associated with a gas turbine engine reduces the amount of payload capable of being carried by an aircraft powered by such an engine. For this reason, it has become common to manufacture housings for fuel-throttling valves out of low-weight materials, such as aluminum or aluminum alloys.

Such low-weight alloys, however, often have one detrimental property in that they are susceptible to extreme erosion when the throttling valve is utilized with the previously mentioned high-pressure fuel.

SUMMARY OF THE INVENTION

It is an object of this invention, therefore, to eliminate erosion problems associated with the housing of a high-pressure fuel-throttling valve.

Briefly stated, this object is carried out by providing a cylindrical-shaped shield which fits within the housing of a spool-type throttling valve and prevents direct impingement of fuel flowing past the spool upon the housing of said valve. The shield is basically a hollow cylinder having a series of perforated portions and a series of solid portions with the solid portions being located opposite a plurality of radial exits located within a sleeve which surrounds the spool of the valve. Fuel flow leaving the radial exits thus impinges upon the shield rather than on the housing of the valve which surrounds the shield.

BRIEF DESCRIPTION OF THE DRAWING

The following description of a preferred embodiment of Applicant's invention will aid the reader in understanding the same. The subject matter of Applicant's invention is particularly pointed out and distinctly claimed in the series of claims appended hereto. The description of the preferred embodiment is given in light of the accompanying drawing, in which:

Figure 1:
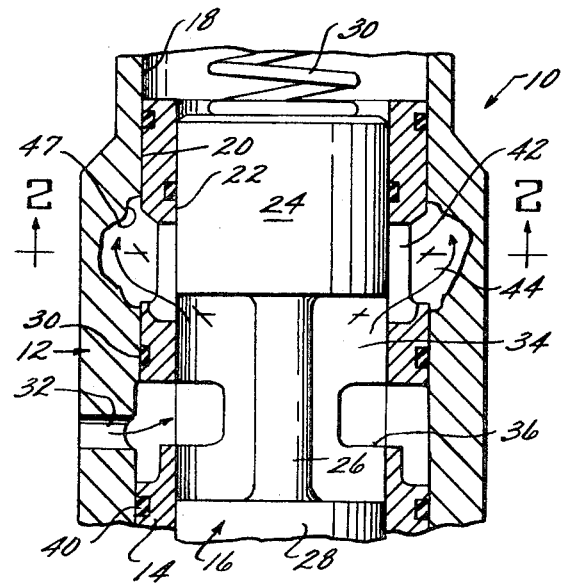
FIG. 1 is a partial cross-sectional view of a throttling valve constructed in accordance with the prior art.
Figure 2:
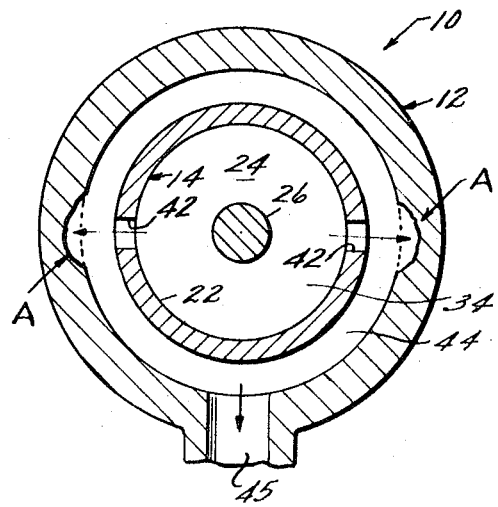
FIG. 2 is a cross-sectional view taken along line 2-2 of FIG. 1.

Referring now to the prior art structure of FIGS. 1 and 2, a fuel-throttling valve, generally designated by the numeral 10, is shown as comprising a housing 12, a sleeve 14 located within the housing 12, and a spool 16 located within the sleeve 14. The housing 12 consists of a hollow cylinder having an inner wall 18 provided therein for engaging the outer perimeter of the sleeve 14. Suitable means (not shown) may be provided to secure the sleeve 14 in a desired position within the housing 12. The sleeve 14 also comprises a hollow cylinder having an outer perimeter 20 which engages the wall 18, as previously mentioned, and an inner wall 22 for receiving the spool 16.

The spool 16 comprises a cylindrical, flow control land 24 rigidly connected to a reduced diameter spindle portion 26 which, in turn, is connected to a second land or sealing member 28. The spool 16 is reciprocal within the sleeve 14 and has associated therewith some control means for providing this reciprocation. While, for clarity sake, such control means are not shown in FIG. 1, they will be readily apparent to one skilled in the art. If desired, a return spring 30 may be positioned within the housing 12 to reposition the spool 16 upon inactivation of the control means.

Reciprocation of the spool 16 is utilized to provide the output of fluid from the valve 10 as will now be described. A high-pressure fluid, such as gas turbine engine fuel, is delivered to the valve 10 through an opening 32 within the housing 12. This fluid enters a chamber 34 defined by the inner wall 22 of the sleeve 14, the bottom portion of the land 24 and the top potion of the land 28. The flow enters the chamber 34 through a number of radial passages 36 provided within the sleeve 14. Flow is prevented from passing between the housing 12 and the outer perimeter 20 of the sleeve 14 by suitable sealing members, such as O-rings 38.

In addition to the radial inlet passages 36, the sleeve 14 is provided with a plurality of radial openings 42, which are sized so as to be capable of being completely covered by the land 24 when the valve 10 is in a closed position. Upon actuation of a suitable command signal, the spool 16 is moved towards the return spring 30, thereby opening a passage between the chamber 34 and the radial openings 42. The high-pressurized fluid thus can flow through the openings 42 into an annular chamber 44 provided within the housing 12 and surrounding the openings 42. The fluid then flows from the chamber 44 through a radial outlet 45 (FIG. 2) provided in the housing 12. Suitable sealing members such as an O-ring 40, again may be provided within the sleeve 14 and/or the spool 16 in order to prevent the flow of fluid between the inner wall 22 of the sleeve 14 and the outer perimeter of the spool 16.

As shown in both FIGS. 1 and 2, the high velocity associated with the flow of the high-pressurized fluid through the radial openings 42 causes erosion of a wall 47 which forms the annular chamber 44 in the housing 12. One example of the eroded housing 12 is shown by the portion labeled with arrow A. The present invention is directed primarily to a means for preventing such erosion which will in no way affect the overall performance or flow passing capabilities of the valve 10.

Figure 3:
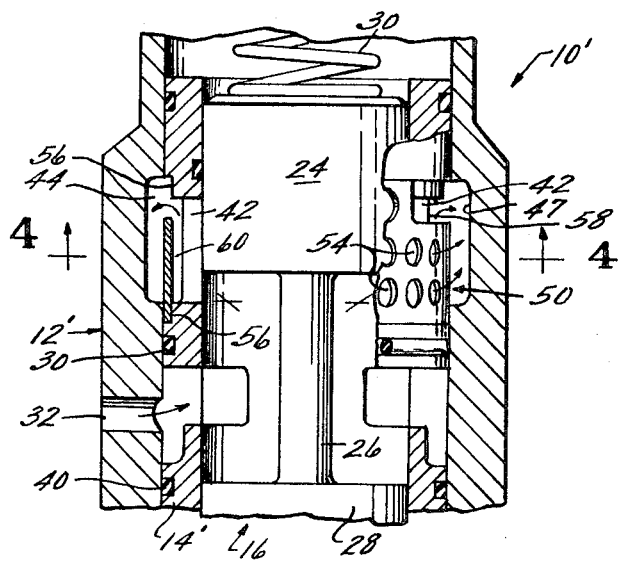
FIG. 3 is a partial cross-sectional view, similar to FIG. 1, of a throttling valve incorporating the erosion shield of the present invention.
Figure 4:
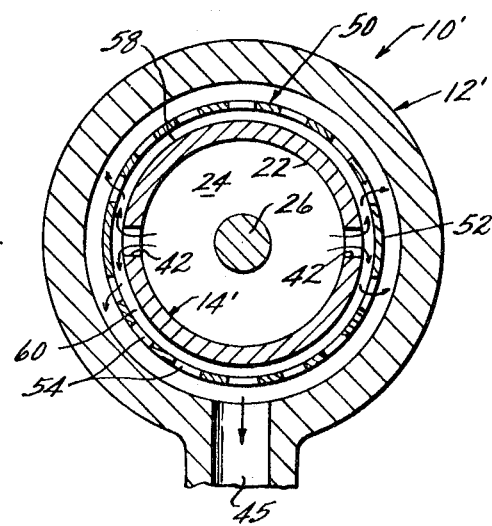
FIG. 4 is a cross-sectional view taken along line 4-4 of FIG. 3.

As shown in FIGS. 3 and 4, a valve 10' is constructed in accordance with the provisions of this invention in such a manner as to prevent erosion of the housing 12 by direct impingement thereon of the highly pressurized fluid. The valve 10' is an improvement over that shown in FIGS. 1 and 2 but has a number of corresponding parts, which in the FIGS. are given like numerals. The primary improvement in valve 10' is that a sleeve 14' is provided with an erosion shield 50 which includes barrier portions which surround the radial openings 42 provided within the sleeve 14'.

The erosion shield 50 comprises basically a hollow cylinder, which is formed of stainless steel or any material showing high-erosion resistance properties. The shield 50 is formed of a plurality of solid-wall portions 52 (FIG. 4), equal in number to the number of radial openings 42 provided in the sleeve 14', and a plurality of perforated wall portions 54, which interconnect each of the solid-wall portions 52. The outer wall of the sleeve 14' is provided with a groove 56 for receiving the sleeve 50, as shown best in FIG. 3. The outer wall of the sleeve 50 is dimensioned so as to be approximately equal to the outer wall of the sleeve 14' when the shield 50 is placed within the groove 56. The inner diameter of the shield 50 is dimensioned such that it is spaced from an indented wall portion 58 of the sleeve 14' around the entire perimeter of the sleeve 14' near the radial openings 42. An annular passage 60, as best shown in FIG. 4, is thus provided between the sleeve 14' and the shield 50 at the locations of the radial openings 42.

The shield 50 may be split along its entire axial length at one or more locations in order to enable placement of the shield 50 around the sleeve 14'. This may not be necessary, of course, if one end of the sleeve 14' is dimensioned such that the shield 50 may be slipped over the end thereof. In either case, the shield 50 is positioned such that its solid-wall portions 52 are located directly opposite the radial openings 42 as shown in FIG. 4. When thus positioned, the shield 50 may be rigidly connected to the sleeve 14' by any desired manner, such as welding or epoxying.

The overall operation of the valve 10' shown in FIGS. 3 and 4 is similar to that of the valve 10 shown in FIGS. 1 and 2. The valve 10' again includes the housing 12 which surrounds the cylindrical sleeve 14' which, in turn, defines a cylindrical chamber for receiving the spool 16. Fluid again enters the valve through the radial inlet 32 provided in the housing 12, and actuation of the spool 16 again causes opening of a passage between the chamber 34 and the chamber 44. Fluid thus flows from the inlets 32, through the chamber 34, through the radial openings 42 to the chamber 44, and out the radial outlet 45.

In the embodiment shown in FIG. 3, however, fluid is incapable of flowing directly through the radial openings 42 and impinging upon the walls 47 which form the annular chamber 44 in the housing 12. Fluid, instead, impinges directly upon the solid-wall portions 52 of the erosion shield 50 and thus flows within the annular passage 60 between the erosion shield 50 and the sleeve 14' until it reaches the perforated portion 54. Fluid then flows through the perforations into the annular chamber 44, from which it flows through the radial outlet 45. As best shown in FIG. 4, the solid wall portions 52 of the shield 50 are sized so as to completely cover the radial openings 42 and to extend past the openings 42 for some distance to ensure that no flow directly impinges upon the housing 12.

Applicant has thus provided a simple, lightweight shield which in no way inhibits the overall operation of the throttle valve but which eliminates the necessity of making the large housing out of a heavier, nonerodable material. Of course, a number of changes could be made in the basic design without departing from the scope of the invention. For example, the shield could be formed as part of the housing or could be connected thereto rather than to the sleeve. In another form, the shield would not necessarily have to form an entire cylinder. That is, it could be formed of a number of sectors, one of which would be located opposite each radial outlet. It is intended that these and all modifications which fall within the scope of Applicant's invention be covered by the appended claims.

What is claimed as new and desired to be secured by Letters Patent of the United States is:

I claim:

1. A throttling valve for controlling the flow of a pressurized fluid, said valve including a housing, an inlet, an outlet, a sleeve positioned within said housing, said sleeve having a plurality of radial openings therein, a spool reciprocal within said sleeve, an annular chamber formed within said housing, means for moving said spool between an open and a closed position, and a shield positioned between said sleeve and said annular chamber and spaced radially from a portion of said sleeve such that fluid may flow between said shield and said sleeve, said shield including barrier means for preventing direct impingement of said pressurized fluid on the walls of said annular chamber as said fluid flows through said openings into said annular chamber.

2. The throttling valve recited in claim 1 wherein said shield comprises a hollow cylindrical member and said barrier means comprise a plurality of solid wall portions of said cylindrical member, said solid-wall portions being interconnected by a plurality of perforated-wall portions.

3. The throttling valve recited in claim 2 wherein said shield is supported by said sleeve.

4. The throttling valve recited in claim 3 wherein said solid-wall portions extend for a length at least as long as that of said openings, and said solid-wall portions are located opposite each of said openings.

5. The throttling valve recited in claim 4 wherein aid shield is constructed of stainless steel.